United States Patent [19]

Kunz

[11] Patent Number: 4,921,570

[45] Date of Patent: May 1, 1990

[54] APPARATUS FOR MANUFACTURING A WELDED CONNECTION OF TUBULAR COMPONENTS OF THERMOPLASTIC MATERIAL

[75] Inventor: Peter Kunz, Schaffhausen, Switzerland

[73] Assignee: Georg Fisher AG

[21] Appl. No.: 232,480

[22] Filed: Aug. 15, 1988

[30] Foreign Application Priority Data

Aug. 28, 1987 [CH] Switzerland .................. 3323/87

[51] Int. Cl.⁵ .................. B29C 65/26; B29C 65/18
[52] U.S. Cl. .................. 156/503; 156/156; 156/158; 156/304.2; 156/304.6; 156/502; 264/248
[58] Field of Search ............. 156/304.2, 304.6, 158, 156/156, 502, 503, 294; 264/248

[56] References Cited

U.S. PATENT DOCUMENTS

| | | | |
|---|---|---|---|
| 2,647,555 | 8/1953 | Hinman | 156/503 |
| 3,865,662 | 2/1975 | Segal | 156/304.6 X |
| 4,288,266 | 9/1981 | Konrad et al. | 156/304.2 X |
| 4,292,101 | 9/1981 | Reichert | 156/156 |
| 4,325,772 | 4/1982 | Suetoshi et al. | 156/294 |
| 4,401,497 | 8/1983 | Worthmann | 156/304.2 X |
| 4,758,302 | 7/1988 | Hannover | 156/390 X |

FOREIGN PATENT DOCUMENTS 3426246  1/1986  Fed. Rep. of Germany ...... 156/156

Primary Examiner—Michael W. Bell
Assistant Examiner—Michele K. Yoder
Attorney, Agent, or Firm—Toren, McGeady & Associates

[57] ABSTRACT

An apparatus for manufacturing a welded connection of tubular components of thermoplastic material includes a bracing device and a heating device to be inserted into the tubular components. The heating device has an expandable hollow body, in the interior of which are arranged an electric heating element and a liquid which expands when heated. When the heating device is heated, the hollow body rests against the ends of the tubular components to be welded together and the necessary welding temperature is transmitted to these components. Since the hollow body rests against the inner circumference of the tubular components, the formation of a welding bead is prevented. After welding has been carried out, the hollow body which has cooled and shrunk is removed by means of a traction strand.

3 Claims, 1 Drawing Sheet

APPARATUS FOR MANUFACTURING A WELDED CONNECTION OF TUBULAR COMPONENTS OF THERMOPLASTIC MATERIAL

BACKGROUND OF THE INVENTION

1. Field of the Invention

The present invention relates to a method for manufacturing a welded connection of tubular components of thermoplastic material. The invention further relates to an apparatus for carrying out the method.

2. Description of the Prior Art

In accordance with a method known from German reference 2,212,055, the ends of tubular components of thermoplastic material to be connected are heated by means of an electrically heatable heating reflector and the ends of the components mounted in the apparatus are pressed together after the heating reflector has been swung away, thereby creating a butt-welding. This method has the disadvantage that a welding bead is formed at the inner circumference of the components. This welding bead reduces the passage area through the components and increases the resistance to flow. Moreover, the danger of undesirable deposits such as dirt or bacteria, is increased. The apparatus for carrying out this method is also very complicated and not well suited for use at construction sites, for example, when it is necessary to work on pipes already placed in ditches.

It is, therefore, the primary object of the present invention to provide a method of the above-described type in which a welding bead on the inner circumference at the welding connection is avoided. The apparatus required for the method is to be simple in its construction and should be usable even at construction sites at already placed pipes.

SUMMARY OF THE INVENTION

In accordance with the present invention, the ends of the tubular components to be welded together are placed in contact with one another and are braced in position at the outer circumference thereof. The thermal energy required for welding is applied against the inner circumference of the tubular components by directly contacting the inner circumference with a heated body which is pressed against the inner circumference as a result of the expansion of the body. After welding has been carried out, the body is cooled and can be pulled out of the tubular components.

The apparatus for carrying out the above-described method includes a bracing device for bracing the outer circumference of the ends of the tubular components to be welded together. A heating device includes a hollow body which is insertable into the tubular components. The hollow body has in the interior thereof an electrical heating element and a thermally expanding medium. The heating element is connected to a current source by means of electric cables.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
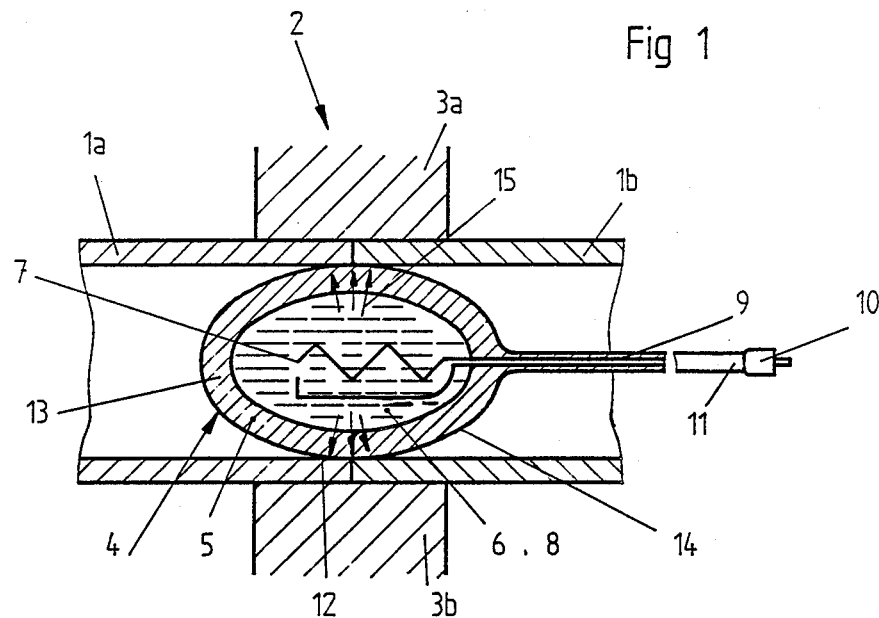
FIG. 1 is a sectional view of an apparatus for welding two tubular components.

FIG. 1 of the drawing shows the ends of two tubular components 1a, 1b of thermoplastic material during welding by means of an apparatus according to the present invention.

The apparatus includes a bracing device 2 with two clamping jaws 3a, 3b which hold the two tubular components 1a, 1b in position. The clamping jaws 3a, 3b, or at least the surfaces coming into contact with the tubular components, consist of a thermally poorly conductive material, such as, stainless steel or ceramic material.

A heating device 4 includes a hollow body 5 which is insertable into the tubular components 1a, 1b. The hollow body 5 preferably is an expandable bag or casing of a heat-resisting elastomer such as a heat-resisting silicone elastomer.

An electric heating element 7 and a thermally expanding liquid 8, such as, synthetic oil, are arranged in the interior 6 of the hollow body 5. The heating element 7 is connected by means of long cables 9 extending out of the tubular components to a current source 10. The cables 9 are arranged in a hose which is a traction strand 11 and is connected to the hollow body 5.

The hollow body 5 is elongated or oval. The hollow body 5 has a cylindrical portion 12 and rounded-off portions 13, 14, the traction strand 11 being fastened to one of the ends 14.

For carrying out the welding procedure, the hollow body 5 is moved with its cylindrical portion 12 into the region of the abutting ends of the tubular components 1a, 1b held by the clamping jaws 3a, 3b. When the current source 10 is switched on, the liquid 8 is heated, the elastic hollow body 5 expands and tightly rests with the cylindrical portion 12 against the inner circumference of the two tubular components 1a, 1b. As a result, the heat which continues to be generated is transmitted to the ends of the components 1a, 1b to be welded together, as indicated by arrows 15, until the thermoplastic material melts and is welded together. After the current supply to the heating element 7 has been switched off, the thermoplastic material cools, possibly with the aid of an external cooling system, and a rigid welded connection is created. The contact of the hollow body 5 with the inner circumference of the tubular components is maintained at least until the thermoplastic material has solidified, so that no welding bead can be created which would reduce the inside width of the tubular components. When the liquid 8 in the interior 6 of the hollow body 5 cools further, the hollow body 5 shrinks into its original shape, so that it can now be pulled out by means of the traction strand 11.

Figures 2A, 2B:
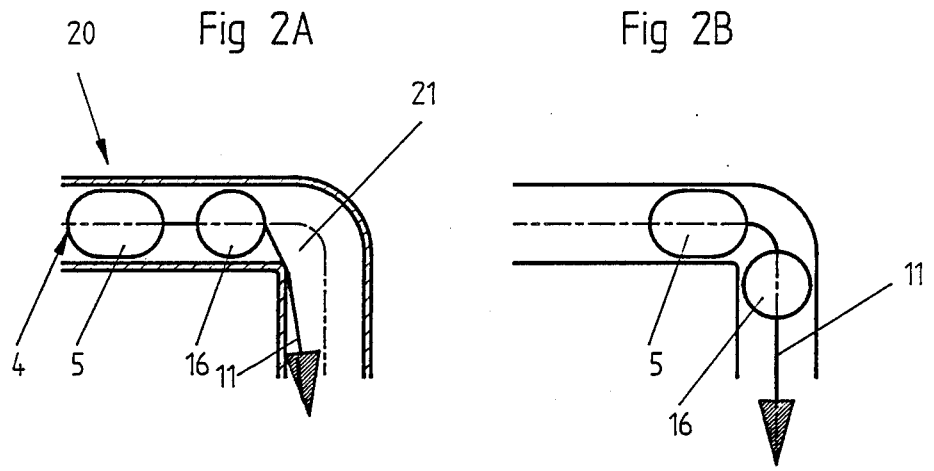
FIGS. 2A–2D schematically illustrate another embodiment of the heating device of the apparatus of FIG. 1, shown in four stages of removing the heating device from a pipe bend.
Figures 2C, 2D:
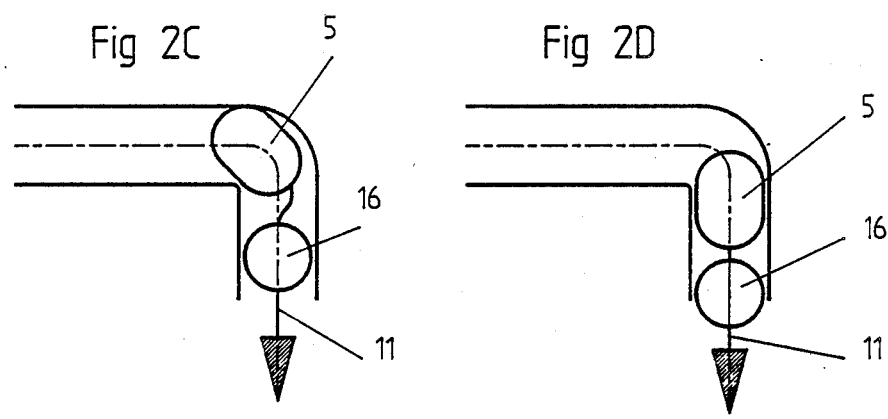

If a pipeline system 20 has sharp bends 21, as shown in FIG. 2, the heating device 4 may have a spherical guide body 16 attached to the traction strand 11 at a predetermined distance away from the hollow body 5. As illustrated in FIGS. 2A to 2D, the guide body 16 enables the entire heating device to be pulled out of a pipeline 20 which has sharp bends 21, without making it necessary to shrink the hollow body to a substantially smaller diameter as compared to the inner diameter of the pipes.

While specific embodiments of the invention have been shown and described in detail to illustrate the application of the inventive principles, it will be understood that the invention may be embodied otherwise without departing from such principles.

I claim:

1. An apparatus for manufacturing a welded connection between end faces of two tubular components of thermoplastic material, comprising a bracing device and a heating device, the bracing device configured to brace against the outer circumference of the tubular components to hold the tubular components in position, such that the end faces of the tubular components are in contact with each other, the heating devices having a hollow body insertable in the tubular components, the hollow body being a casing of a heat-resisting elastomer and having an interior, an electric heating element and a thermally expandable liquid medium arranged in the interior which is capable of expanding the hollow body, and electric cables for connecting the heating element to a current source, wherein the hollow body has a cylindrical portion and rounded-off ends, a traction strand being connected to one of the ends, the cables being arranged inside of the traction strand, and wherein the bracing device has clamping jaws of thermally poorly conductive material.

2. The apparatus according to claim 1, comprising a spherical guide body attached to the traction strand at a certain distance from the hollow body.

3. The apparatus according to claim 1, wherein the hollow body is a casing of heat-resisting silicone elastomer.

* * * * *